(12) United States Patent
Bhatnagar (10) Patent No.: US 7,343,096 B1
(45) Date of Patent: Mar. 11, 2008

(54) METHOD AND APPARATUS FOR IN-SERVICE UPGRADING OF OADM TO WAVELENGTH SELECTIVE SWITCH OF HIGHER DEGREE

(75) Inventor: Vipul Bhatnagar, Kensington, MD (US)

(73) Assignee: Ciena Corporation, Linthicum, MD (US)

( * ) Notice: Subject to any disclaimer, the term of this patent is extended or adjusted under 35 U.S.C. 154(b) by 541 days.

(21) Appl. No.: 10/868,795

(22) Filed: Jun. 17, 2004

Related U.S. Application Data

(60) Provisional application No. 60/479,180, filed on Jun. 18, 2003.

(51) Int. Cl.
*H04J 14/02* (2006.01)
(52) U.S. Cl. ............................. 398/83; 398/45; 398/48; 398/49; 398/50; 398/82
(58) Field of Classification Search .................. 398/4, 398/9, 58–141, 45–50; 385/24; 359/341.2
See application file for complete search history.

(56) References Cited

U.S. PATENT DOCUMENTS

| 6,137,603 | A | * | 10/2000 | Henmi | 398/4 |
| 6,236,499 | B1 | * | 5/2001 | Berg et al. | 359/341.2 |
| 6,285,479 | B1 | * | 9/2001 | Okazaki et al. | 398/56 |
| 6,813,408 | B2 | * | 11/2004 | Bortolini | 385/17 |
| 6,842,562 | B2 | * | 1/2005 | Kinoshita et al. | 385/24 |
| 6,895,186 | B2 | * | 5/2005 | Stern | 398/83 |
| 2001/0040710 | A1 | * | 11/2001 | Sharratt et al. | 359/119 |
| 2003/0156845 | A1 | * | 8/2003 | Persson | 398/141 |
| 2003/0175029 | A1 | * | 9/2003 | Harney et al. | 398/83 |
| 2004/0184809 | A1 | * | 9/2004 | Miyata et al. | 398/85 |
| 2005/0175346 | A1 | * | 8/2005 | Takeguchi et al. | 398/83 |

\* cited by examiner

*Primary Examiner*—Kenneth Vanderpuye
*Assistant Examiner*—Li Liu
(74) *Attorney, Agent, or Firm*—Clements Walker; Christopher L. Bernard; Tyler S. Brown (57) ABSTRACT

System and methods for upgrading an optical add-drop multiplexer (OADM) to higher degree wavelength selective router (WSR)/wavelength selective switch (WSS) are disclosed. For example, an OADM of degree-2 may be provisioned for upgrades to degree-3 and higher. The existing links power and signal-to-noise (SNR) budgets are not significantly affected when the node is upgraded to a higher degree WSS/WSR. Cascaded power dividers and combiners may be used in conjunction with optical amplifiers and reconfigurable blocking filters to increase the number of paths over which an optical signal can be routed/switched without affecting the paths already utilized. Prior to enabling service on either an input or output fiber, taps and combiners are pre-provisioned so as to ensure that at least one additional transmission path is always available.

25 Claims, 8 Drawing Sheets

METHOD AND APPARATUS FOR IN-SERVICE UPGRADING OF OADM TO WAVELENGTH SELECTIVE SWITCH OF HIGHER DEGREE

PROVISIONAL APPLICATION

The present application claims priority under 35 U.S.C. § 120 of a provisional application 60/479,180 filed on Jun. 18, 2003, the entirety of which is hereby incorporated by reference.

FIELD OF THE INVENTION

The field of the invention generally relates to optical networks. More particularly, the field of the invention is directed to a method and apparatus for enabling in-service upgrades of optical add-drop multiplexers (OADM) to wavelength selective switches (WSS) or routers (WSR) of higher degrees.

BACKGROUND OF THE INVENTION

Optical networks provide a tremendous capacity advantage. Entities wishing to take advantage of the advantages that optical networks offer, must usually make a decision based on their current needs (which may be modest and predictable) and their future needs (which are typically unpredictable). An entity may decide to acquire a network to meet its short-term needs because of it's present financial constraints.

However, this approach carries a risk that the network will be insufficient and may cost more in the long run because the entire network has to be replaced due to inadequacies of the network. Also, any upgrades may require the network to be shut down prior to the upgrade. Such a shut down is costly since no service can be provided, which in turn shuts down a revenue stream. In an industry such as telecommunications, shut down can be extremely costly.

Another approach is to project a long-term need and acquire a network with capabilities to meet the long-term need. This approach also carries inherent risks as well. In the short run, the investment in the network will be wasted to the extent that there will be excess capacity. In the long run, the needs of the entity may change in a different direction and the acquired network will not be able to handle the changed needs efficiently.

Current optical networks typically include wavelength selective switches (WSS) and routers (WSR). A WSS/WSR of degree N is an apparatus which switches wavelengths from N input fibers to N output fibers. Most practical applications require only switching N inputs to (N−1) outputs. The switching/routing operation occurs entirely within the optical domain, although the control signals for the WSS are electrical.

Figure 1:
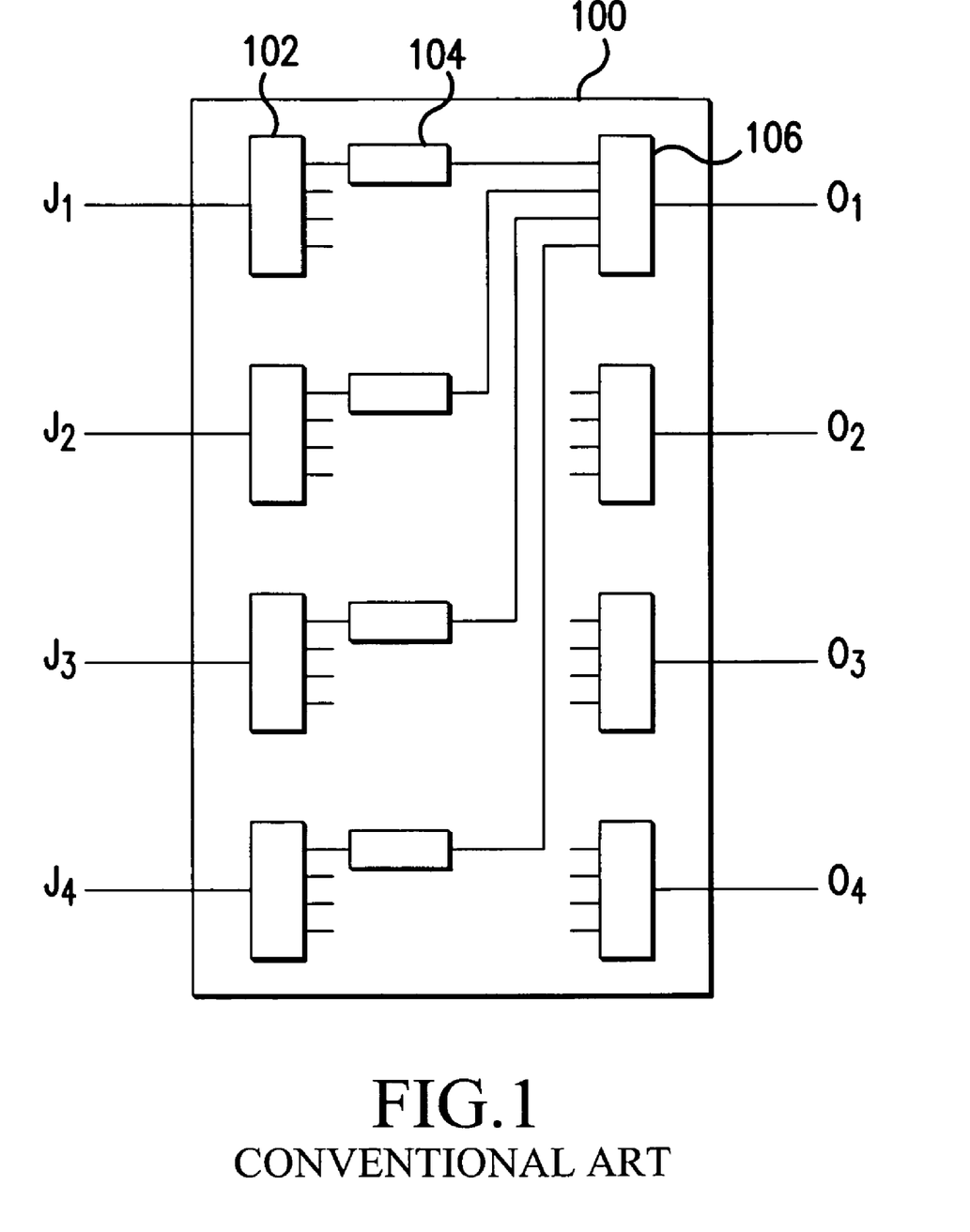
FIG. 1 illustrates a conventional design for a wavelength selective switch apparatus.

FIG. 1 illustrates a conventional design for a WSS/WSR apparatus 100. In this instance the WSS/WSR apparatus 100 is a degree 4 WSS/WSR. The WSS/WSR apparatus 100 includes a plurality of optical splitters 102, a plurality of wavelength filters 104, and a plurality of optical combiners 106.

Each optical splitter 102 is a 1:4 splitter (one input, four outputs) and each optical combiner is a 4:1 combiner (four inputs, one output). If fully connected, then there may be as many as sixteen wavelength filters 104 (combination of 4 inputs and 4 outputs). However, for simplicity, only the connections to the first optical combiner 106 are illustrated.

A WSS/WSR of degree N with capability to drop wavelengths from any of the N inputs and add wavelengths to any of the N outputs is an OADM of degree N. The simplest and most common type of OADM is a degree-2 OADM.

Figure 2:
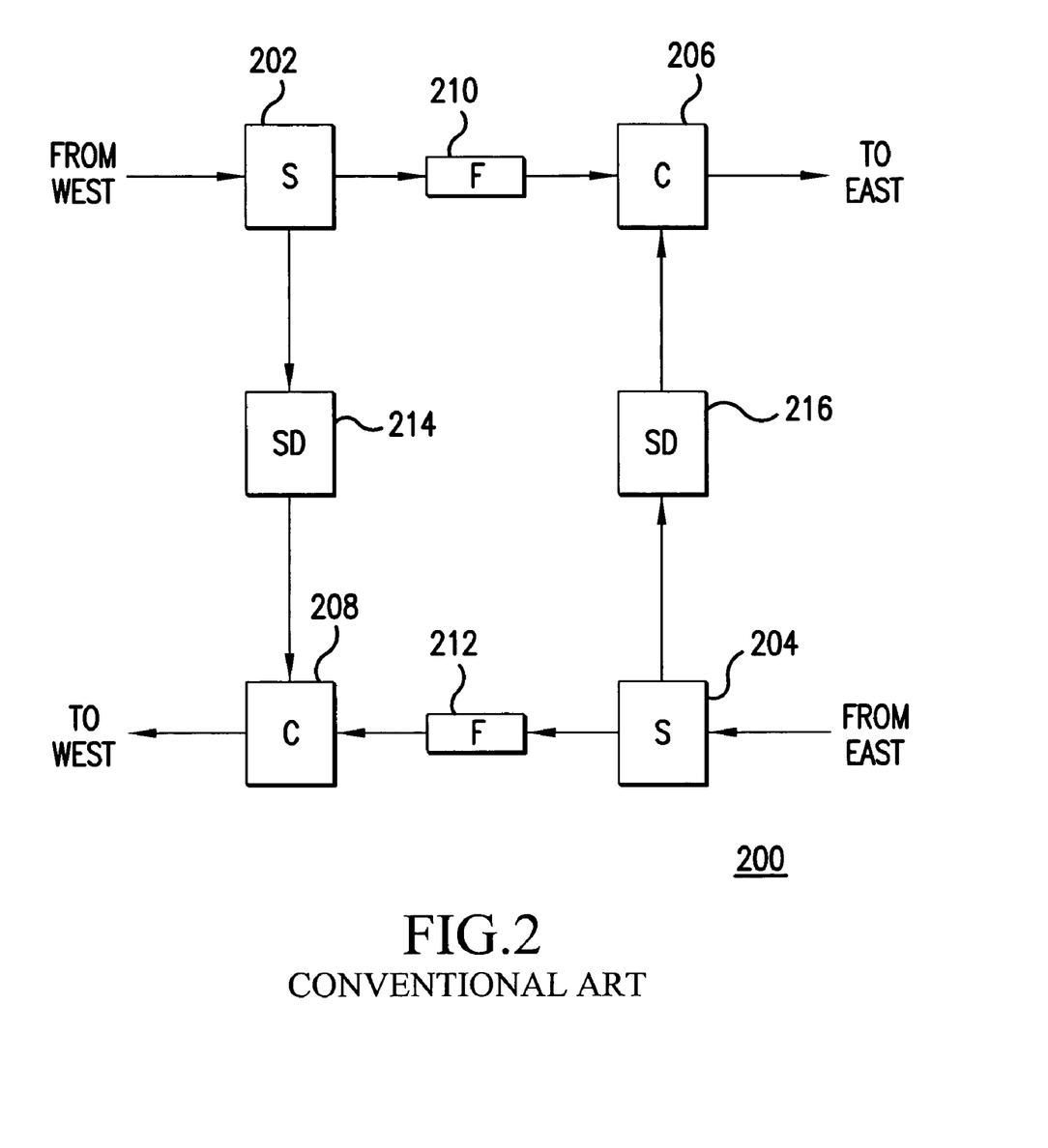
FIG. 2 illustrates a conventional optical add/drop multiplexer (OADM)

FIG. 2 illustrates a conventional OADM 200. In this instance, the OADM 200 is a degree 2 OADM. The OADM 200 includes first and second optical splitters 202 and 204, first and second optical combiners 206 and 208, first and second wavelength filters 210 and 212, and first and second wavelength demux/mux devices 214 and 216.

As shown, optical signal sources FROM-WEST and FROM-EAST are connected to the input of the first and second optical splitters 202, 204, respectively. Each optical splitter 202, 204 splits the optical signals and directs the signals to the respective wavelength filters 210, 212 and to the respective wavelength demux/mux devices 214, 216. The first and second optical combiners 206, 208 receive optical signals from the respective wavelength filters 210, 212 and from the respective wavelength demux/mux devices 214, 216 and output the combined optical signals to the TO-EAST and TO-WEST optical signal destinations, respectively.

As noted previously, WSS/WSR may be constructed from one or more OADMs. Indeed, an OADM providing connectivity between more than two fibers is considered to be a WSS or WSR. Typically, network connectivity evolves from network elements—such as OADM/WSS/WSR—from a lower degree (degree 2 being the most common) to a higher degree.

However, if the conventional OADM 200 as shown in FIG. 2 is to be upgraded to a higher degree OADM/WSS/WSR, it is clear that disruption of the signals traversing the OADM 200 will occur since any upgrade will require the OADM 200 to be shut down. In other words, an in-service upgrade, where disruption of service does not occur, cannot take place.

An approach is desired where the system deployed is extremely flexible so that future demands on the optical networks, not yet foreseen, may be handled with ease. As the capacity demand grows and changes, it is desirable to provide a flexible system that can meet the increased demand and the type of demand changes. It is also desirable to have the capability to recover previously inaccessible capacity and without service disruptions.

BRIEF DESCRIPTION OF THE DRAWINGS

Features of the present invention will become more fully understood to those skilled in the art from the detailed description given herein below with reference to the drawings, which are given by way of illustrations only and thus are not limitative of the invention, wherein.

DETAILED DESCRIPTION

For simplicity and illustrative purposes, the principles of the present invention are described by referring mainly to exemplary embodiments thereof. The same reference numbers and symbols in different drawings identify the same or similar elements. Also, the following detailed description does not limit the invention. The scope of the invention is defined by the claims and equivalents thereof.

The expression "optically connects" or "optically communicates" as used herein refers to any connection, coupling, link or the like by which optical signals carried by one optical element are imparted to the "connecting element." Such "optically communicating" devices are not necessarily directly connected to one another and may be separated by intermediate optical components and/or devices. Likewise, the expressions "connection", "operative connection", and "optically placed" as used herein are relative terms and do not necessarily require a direct physical connection.

Figure 3:
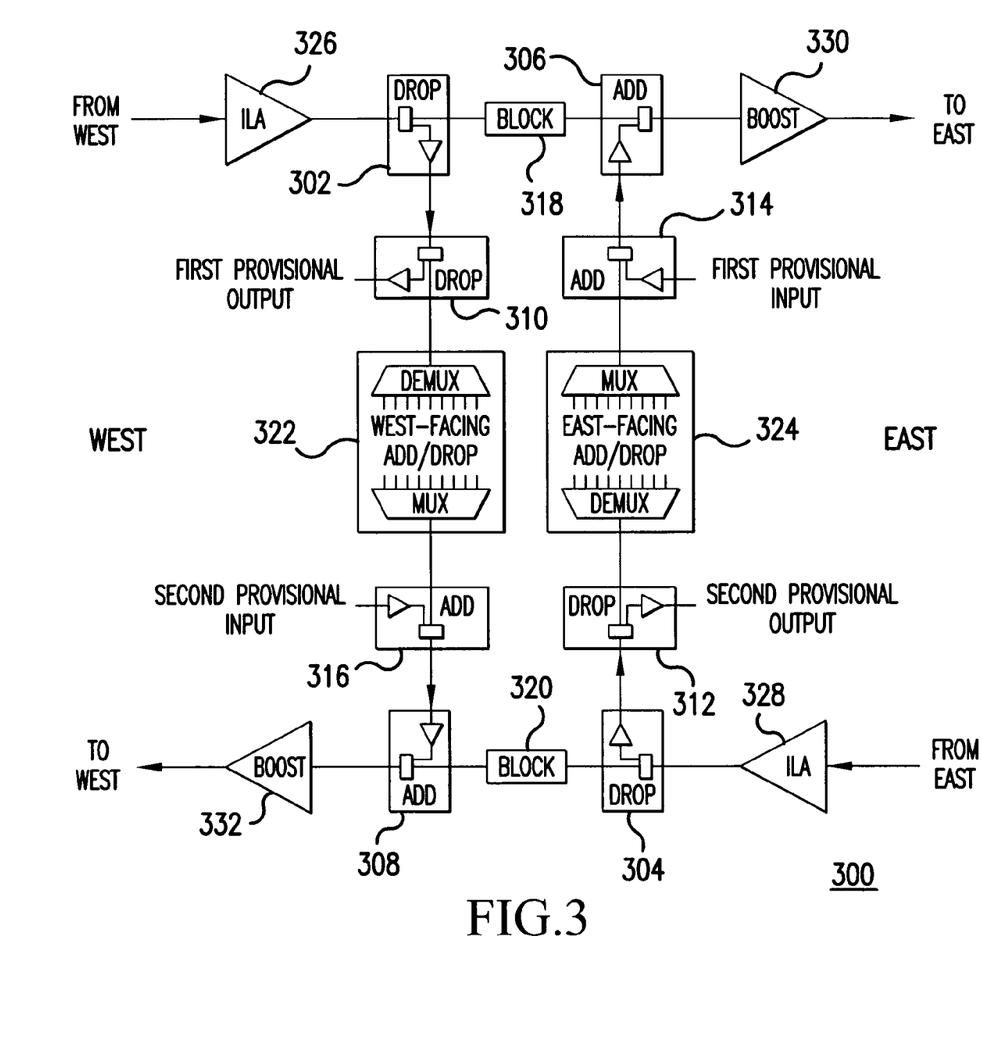
FIG. 3 illustrates an OADM according to an embodiment of the present invention.

FIG. 3 illustrates an OADM 300, which is a degree 2 OADM. The OADM 300 may be pre-provisioned with add/drop taps to allow a future in-service upgrade to a degree N WSS/WSR, (N arbitrary, >2). The OADM 300 may include first and second input drop taps 302, 304 and first and second provisional drop taps 310, 312.

Figure 4A:
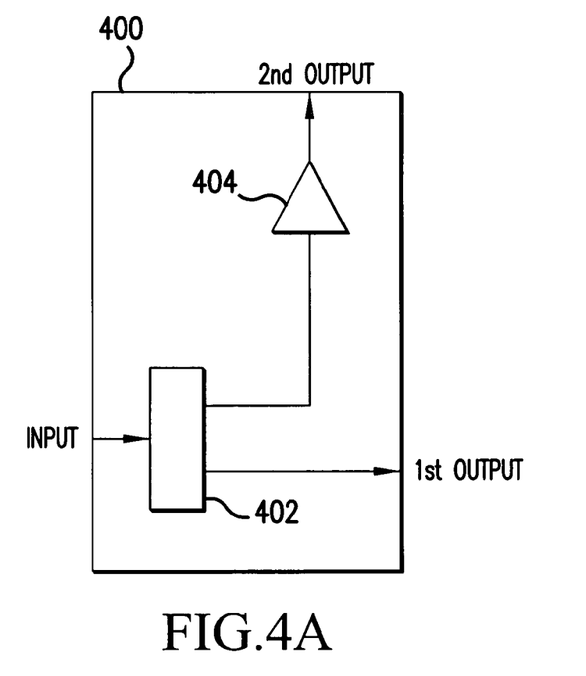
FIGS. 4A and 4B illustrate drop taps according to embodiments of the present invention.
Figure 4B:
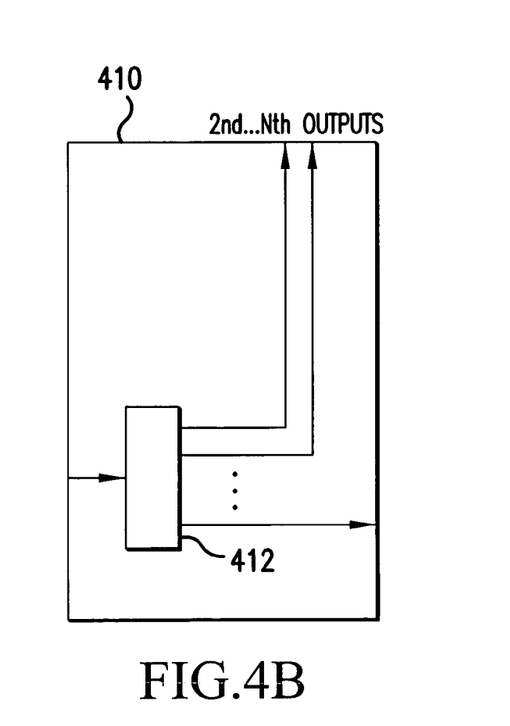

Each of the drop taps 302, 304, 310, 312 may be a drop tap 400, 410 of the types as illustrated in FIGS. 4A and 4B. A drop tap may include an input and a plurality of outputs. For example, the drop tap 400 as shown in FIG. 4A includes an input and first and second outputs. The drop tap 410 as shown in FIG. 4B also includes and input and a plurality of outputs (including first and second outputs). Each drop tap 400, 410 may be configured to direct optical signals present at its input to each of the outputs including the first and second outputs.

The drop tap 400, 410 may include an optical splitter 402, 412 (or simply "splitter") configured to direct optical signals present at its input to its plurality of outputs. For example, the splitter 402 of the drop tap 400 (see FIG. 4A) directs optical signals present at its input to its first and second outputs. The splitter 412 (see FIG. 4B) also directs optical signals from its input to its plurality of outputs, including the first and second outputs.

The input of the splitter 402, 412 may optically communicate with the input of the drop tap 400, 410. Indeed, the input of the of the splitter 402, 412 may serve as the input of the drop tap 400, 410. Likewise, the plurality of outputs of the drop tap 402, 412 including the first and second outputs, may optically communicate with the corresponding outputs of the drop tap 400, 410, and may indeed serve as the corresponding outputs of the drop tap 400, 410.

The splitter 402, 412 may be configured to deliver differing amounts of power to the outputs. For example, the splitter 402 of the drop tap 400 may direct a majority of output power to the first output of the splitter 402, and consequently to the first output of the drop tap 400. Generally, low insertion loss on one path is desirable to minimize the number of amplifiers used for the bypass configuration. Indeed, the splitter 402, 412 may be such that the amount of power directed to each of the outputs is dynamically tunable.

The drop tap may also include a line amplifier to amplify optical signals from its input to its output. Examples of line amplifiers include EDFA (erbium doped fiber amplifier), SoA (semiconductor optical amplifier), and other gain media and optically active materials.

For example, the drop tap 400 may include a line amplifier 404 with its input optically communicating with the second output of the splitter 402 and its output optically communicating with the second output of the drop tap 400. This may be useful in circumstances wherein the amount of optical power of the source is low. For example, this may occur if the splitter 402 is configured to direct a majority of output power to the first output, and consequently delivers only a small amount of power to its second output.

While not specifically shown, it should be noted that any of the inputs and outputs of the splitter 402 and/or 412 may be optically connected with a line amplifier as desired.

Referring back to FIG. 3, the input of the first and second input drop taps 302, 304 may optically communicate external optical signal sources FROM-WEST and FROM-EAST, respectively.

It should be noted that the labels FROM-WEST and FROM-EAST (and likewise TO-EAST and TO-WEST) are for the convenience of labeling the different sources and destinations of optical signals. The labels do not necessarily indicate the actual direction of flow of the optical signals.

The OADM 300 may also include first and second blocking filters 318 and 320. The inputs of the first and second blocking filters 318, 320 may optically communicate with the first outputs of the first and second input drop taps 302, 304, respectively.

Figure 5A:
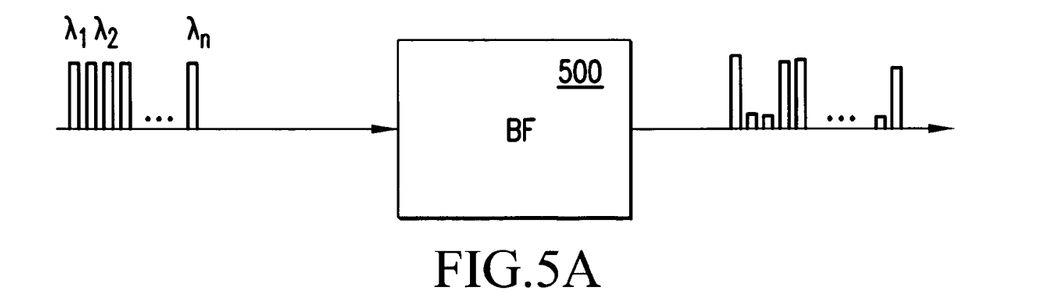
FIGS. 5A and 5B illustrate blocking filters according to embodiments of the present invention.
Figure 5B:
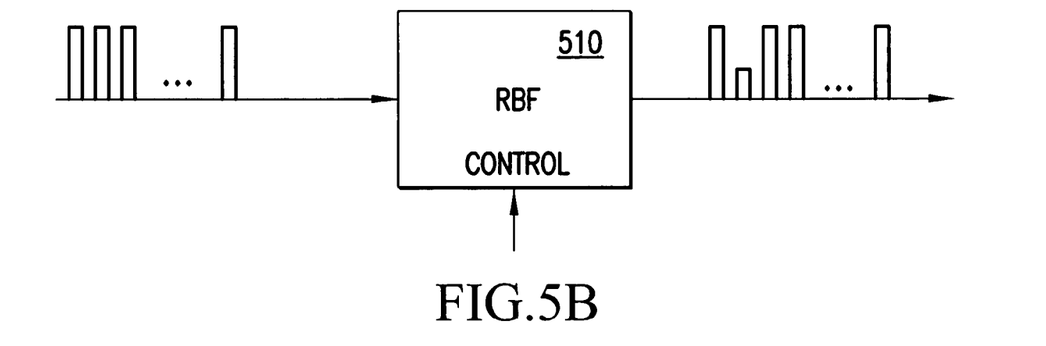

Each of the blocking filters 318 and 320 may be a blocking filter 500, 510 of the type as illustrated in FIGS. 5A and 5B. As illustrated, each blocking filter 500, 510 may receive optical channels $\lambda_1 \ldots \lambda_n$ at its input. However, the blocking filter 500, 510 severely attenuates (or blocks) optical signals of certain channels while allowing other subset of optical channels to pass through without much attenuation. Generally, the channels are blocked to prevent overlap of optical channels that may be added on the add path.

The blocking filter 510 is a reconfigurable blocking filter and includes a control input. Through the use of the control input, the channels of optical signals selected for blocking may be dynamically tunable. Examples of optical channel blocking technology may be found in U.S. Pat. Nos. 6,141,361; 5,974,207; 6,625,346; 6,687,431 or the like.

Referring back to FIG. 3, the second outputs of the first and second input drop taps 302, 304 may optically communicate with the inputs of the first and second provisional drop taps 310, 312. In this instance, the provisional drop taps 310, 312 are shown as being of the type of drop tap 400 as illustrated in FIG. 4A. However, as noted above, one or both of the provisional drop taps 310, 312 may also be of the type of drop tap 410 as illustrated in FIG. 4B.

For each of the first and second provisional drop taps 310, 312, one output may be provisioned for future in-service upgrades. For example, as illustrated in FIG. 3, the second outputs of the provisional drop taps 310, 312 may be provisioned for such future use (first and second provisional outputs).

The first outputs of the first and second provisional drop taps 310, 312 may optically communicate with corresponding inputs of the first and second wavelength demux/mux devices 322, 324. The optical signals flowing into the wavelength demux/mux devices 322, 324 may be demultiplexed and provided for local destinations. Similarly, optical signals from local sources may be multiplexed and output from the first and second wavelength demux/mux devices 322, 324.

Figure 6A:
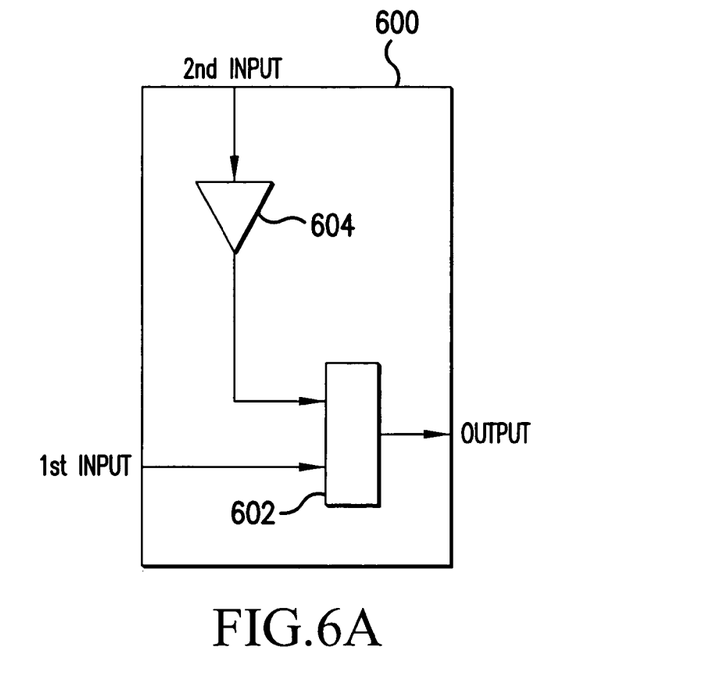
FIGS. 6A and 6B illustrate add taps according to embodiments of the present invention.
Figure 6B:
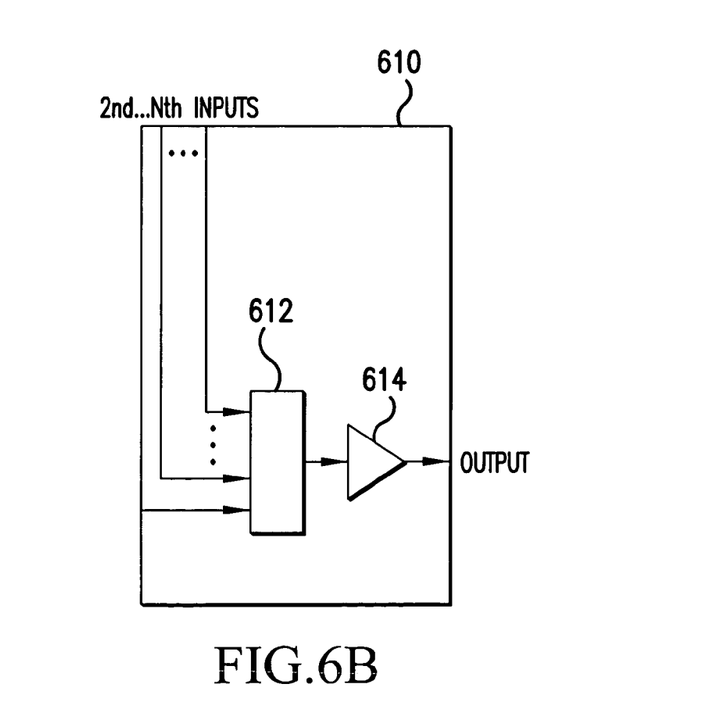

The OADM 300 may also include first and second output add taps 306, 308 and first and second provisional add taps 314, 316. Each add tap 306, 308, 314, and 316 may be an add tap 600, 610 of the type as illustrated in FIGS. 6A and 6B. An add tap may include a plurality of inputs and an output. For example, the add tap 600 as shown in FIG. 6A includes first and second inputs and an output. The add tap 610 as shown in FIG. 6B also includes a plurality of inputs (including first and second inputs) and an output. Each add tap 600, 610 may be configured to direct optical signals present at each of its plurality of inputs to its output.

The add tap 600, 610 may include an optical combiner 602, 612 (or simply "combiner") configured to direct optical signals present at its plurality of inputs to its output. For example, the combiner 602 of the add tap 600 (see FIG. 6A) directs optical signals present at its first and second inputs to its output. The combiner 612 (see FIG. 5B) also directs optical signals from its plurality of inputs to its output, including from the first and second inputs.

The output of the combiner 602, 612 may optically communicate with the output of the add tap 600, 610. Indeed, the output of the of the combiner 602, 612 may serve as the output of the add tap 600, 610. Likewise, the plurality of inputs of the combiner 602, 612 including the first and second inputs, may optically communicate with the corresponding inputs of the add tap 600, 610, and may indeed serve as the corresponding inputs of the add tap 600, 610.

The combiner 602, 612 may be configured to deliver differing amounts of power from each of the inputs to the output. Indeed, the combiner 602, 612 may be such that the amount of power directed to from each of the inputs to the output is dynamically tunable.

The add tap may also include a line amplifier to amplify optical signals from its input to its output. For example, the add tap 600 may include a line amplifier 604 with its input optically communicating with the second input of the add tap 600 its output optically communicating with the second input of the combiner 602. This may be useful in circumstances wherein the amount of optical power delivered to the second input of the add tap 600 is low.

The line amplifier may also be utilized to amplify the output signal from the combiner. For example, the add tap 610 may include a line amplifier 614 with its input optically communicating with the output of the combiner 612 and its output optically communicating with the output of the add tap 610.

While not specifically shown, it should be noted that any of the inputs and outputs of the combiner 602 and/or 612 may be optically connected with a line amplifier as desired.

Referring back to FIG. 3, the outputs of the first and second wavelength demux/mux devices 322, 324 may optically communicate with the first inputs of the second and first provisional add taps 316, 314, respectively. The outputs of the first and second provisional add taps 314, 316 may optically communicate with the second inputs of the first and second output add taps 306, 308, respectively, and the outputs of the first and second blocking filters 318, 320 may optically communicate with the first inputs of the first and second output add taps 306, 308, respectively. Further, the outputs of the first and second output drop taps 306, 306 may optically communicate external optical signal destinations TO-WEST and TO-EAST, respectively.

Similar to the situation described above for the first and second provisional drop taps 310, 312, one output of each of the first and second provisional add taps 314, 316 may be provisioned for future in-service upgrades. For example, as illustrated in FIG. 3, the second inputs of the provisional add taps 314, 316 may be provisioned for such future use (first and second provisional inputs).

Signals from one or both of the FROM-WEST and FROM-EAST sources may be amplified. As shown in FIG. 3, the OADM 300 may include a first in-line amplifier 326 or a second in-line amplifier 328 or both. Each inline amplifier 326, 328 may be configured to amplify optical signals present at its input and direct the amplified optical signals to its output.

If present, the input of the first in-line amplifier 326 may optically communicate with the first input of the OADM 300 (FROM-WEST source) and the output of the first in-line amplifier 326 may optically communicates with the input of the first input drop tap 302.

Also if present, the input of the second in-line amplifier 328 may optically communicate with the second input of the OADM 300 (FROM-EAST source) and the output of the second in-line amplifier 328 may optically communicate with the input of the second input drop tap 304.

Also, the signals to one or both of the TO-WEST and TO-EAST destinations may be amplified. As shown in FIG. 3, the OADM 300 may include a first boost amplifier 330 or a second boost amplifier 332 or both. Each boost amplifier 330, 332 may be configured to amplify optical signals present at its input and direct the amplified optical signals to its output.

If present, the output of the first boost amplifier 330 may optically communicate with the first output of the OADM 300 (TO-EAST destination) and the input of the first boost amplifier 330 may optically communicates with the output of the first output add tap 306.

Also if present, the output of the second boost amplifier 332 may optically communicate with the second output of the OADM 300 (TO-WEST destination) and the input of the second boost amplifier 332 may optically communicate with the output of the second output add tap 308.

As noted previously, the OADM 300 allows future in-service upgrades to take place, i.e. without disrupting the traffic of information flow. The upgrades may take place by optically connecting other elements to the provisional input(s) and output(s). Because the provisional input(s) and output(s) are utilized, the OADM 300 itself need not be shut down and thus, traffic flow of information to and from the wavelength demux/mux devices 322, 324 are not disrupted.

As an aside, the signal output from the first provisional output is the signal from the source FROM-WEST and the signal output from the second provisional output is the signal from the source FROM-EAST. Conversely, any future optical signals provided on the first provisional input will be delivered to the destination TO-EAST and any future optical signals provided on the second provisional input will be delivered to the destination TO-WEST.

By analyzing the differences between FIGS. 2 and 3, a general method to upgrade from an OADM/WSS/WSR that is not provisioned for future in-service upgrades (e.g. OADM 200) to an OADM/WSS/WSR that is provisioned for future in-service upgrades (e.g. OADM 300) may be determined. In FIG. 3, the first and second provisional inputs and first and second provisional outputs allow the degree of the OADM 300 to be increased.

However, strictly speaking, the degree of the WSS/WSR may be increased even if only one pair of provisional input and output exists. For example, it is only necessary that the first provisional input and the first provisional output be provided.

From this perspective, a method to upgrade an OADM which has not been provisioned for future in-service upgrades to an OADM/WSS/WSR that allows for future in-service upgrades may be as follows. First, a provisional drop tap (such as the first provisional drop tap 310) may be inserted so that the input of provisional drop tap 310 optically communicates with the second output of the first input drop tap 302 and the first output of the provisional drop tap 310 optically communicates with the input of the first wavelength demux/mux device 322. In this instance, the second output of the provisional drop tap 310 may serve as the provisional output for future in-service upgrades.

Second, a provisional add tap (such as the first provisional add tap 314) may be inserted so that the output of provisional add tap 314 optically communicates with the second input of the first output add tap 306 and the first input of the provisional add tap 314 optically communicates with the output of the second wavelength demux/mux device 324. In this instance, the second input of the provisional add tap 314 may serve as the provisional input for future in-service upgrades.

It should be noted that the order of insertion need not be performed as stated above. Also, provisional drop tap 310 may be either type of drop taps 400, 410 and the provisional add tap 314 may be either type of add taps 600, 610.

Figure 7:
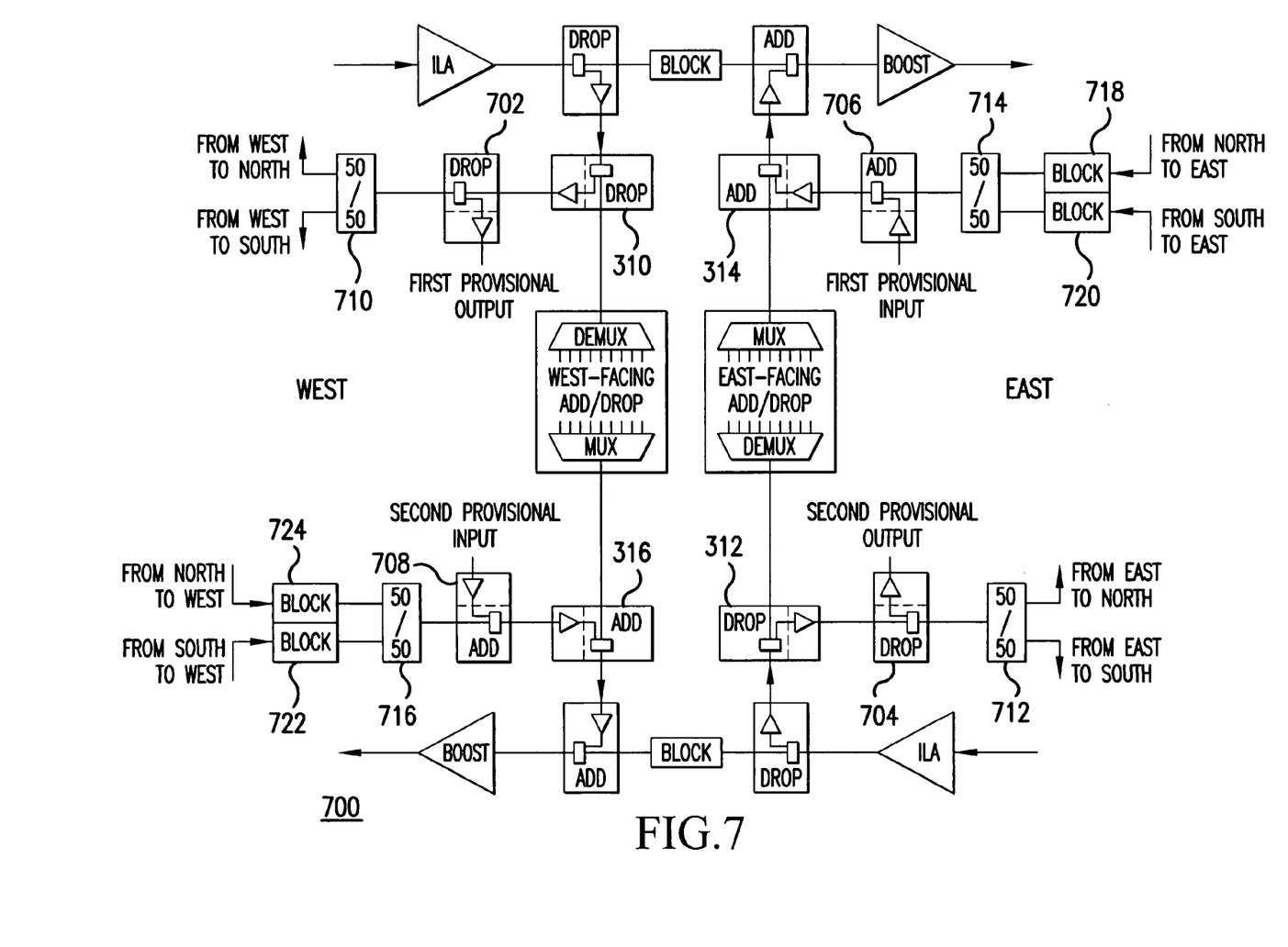
FIG. 7 illustrates an example of an upgrade of an WSS/WSR to a higher degree WSS/WSR according to an embodiment of the present invention.

FIG. 7 illustrates an example upgrade of the OADM 300 of FIG. 3 to a higher degree WSS/WSR 700. In FIG. 7, the WSS/WSR 700 is a degree 4 WSS/WSR due to the mirror like and pair-wise insertions of expansion drop taps (702 and 704), expansion add taps (706 and 708), expansion splitters (710 and 712), expansion combiners (714 and 716), and blocking filters (718, 720, 722, and 724).

However, as indicated above, the pair-wise insertion is not strictly necessary to increase the degree of the OADM/WSS/WSR. For this reason and also for clarity, the WSS/WSR 700 will be described with references to additional elements of the top half of FIG. 7.

As shown, the WSS/WSR 700 illustrated in FIG. 7 may include all elements of the OADM 300 illustrated in FIG. 3. In addition, the WSS/WSR 700 may include the expansion drop tap 702. While shown as being of the type of drop tap 400, the drop tap 702 may also be of the type of drop tap 410. The input of the expansion drop tap 702 may optically communicate with the second output of the provisional drop tap 310.

The WSS/WSR 700 may also include the expansion optical splitter 710 configured to direct optical signals present at its input and direct the optical signals to its first and second outputs. The splitter 710 may be of the type of splitter 402 described above. Also, while the splitter 710 is illustrated as delivering equal amounts of output power to the first and second outputs in FIG. 7, like the splitter 402, the amount of output power delivered to each output may be tunable and need not be evenly split.

The first and second outputs of the splitter 710, both of which provide optical signals from the FROM-WEST source, may optically communicate with other destinations. The first output of the expansion drop tap 702 may optically communicate with the input of the splitter 710.

Note that after this part of the upgrade is completed, the new provisional output is the second output of the expansion drop tap 702. In effect, the expansion drop tap 702 becomes the new provisional drop tap so that further future in-service upgrades may take place.

The WSS/WSR 700 may include the expansion add tap 706. While shown as being of the type of add tap 600, the add tap 706 may also be of the type of add tap 610. The output of the expansion add tap 706 may optically communicate with the second input of the provisional add tap 314.

The WSS/WSR 700 may also include an expansion optical combiner 714 configured to direct optical signals present at its input and direct the optical signals to its first and second outputs. The combiner 714 may be of the type of combiner 602 described above. Also, while the combiner 714 is illustrated as delivering equal amounts of output power from the first and second inputs to the output in FIG. 7, like the splitter 602, the amount of output power delivered from each input may be tunable and need not be even.

The first and second inputs of the combiner 714, the optical signals of which will be delivered to the TO-EAST destination, may optically communicate with other optical signal sources. The first input of the expansion add tap 706 may optically communicate with the output of the combiner 714.

Note that after this part of the upgrade is completed, the new provisional input is the second input of the expansion add tap 706. In effect, the expansion add tap 706 becomes the new provisional add tap so that further future in-service upgrades may take place.

The WSS/WSR 700 may further include a first expansion blocking filter 718 whose output may optically communicate with the first input of the expansion combiner 714 and/or a second expansion blocking filter 720 whose output may optically communicate with the second input of the expansion combiner 714. One or both of the expansion blocking filters 718, 720 may be of the type of blocking filter 600 or 610 described above.

By analyzing FIG. 7, a general method to upgrade from an OADM/WSS/WSR which has been provisioned for in-service upgrades (e.g. OADM 300) to an OADM/WSS/WSR of a higher degree (e.g. WSS/WSR 700) may be determined.

The method may include inserting an expansion drop tap 702 such that the input of the expansion drop tap 702 optically communicates with the second output of the provisional drop tap 310 and inserting an expansion splitter 710 such that the first output of the expansion drop tap 702 optically communicates with the input of the expansion splitter 710. If desirable or necessary, the amount of power delivered to each of the first and second outputs of the expansion splitter 710 may be tuned.

The method may also include inserting an expansion add tap 706 such that output of the expansion add tap 706 optically communicates with the second input of the provisional add tap 314 and inserting an expansion combiner 714 such that the first input of the expansion add tap 706 optically communicates with the output of the expansion combiner 714. If desirable or necessary, the amount of power delivered from each of the first and second inputs of the expansion combiner 714 may be tuned.

The method may further include inserting a first expansion blocking filter 718 or a second expansion blocking filter 720 or both. If inserted, the output of the first expansion blocking filter 718 may optically communicate with the first input of the expansion combiner 714. If inserted, the output of the second expansion blocking filter 720 may optically communicate with the second input of the expansion combiner 714. If desired or necessary, the selection of optical channels to be blocked by the expansion filters 718, 720 may be controlled individually.

Figure 8:
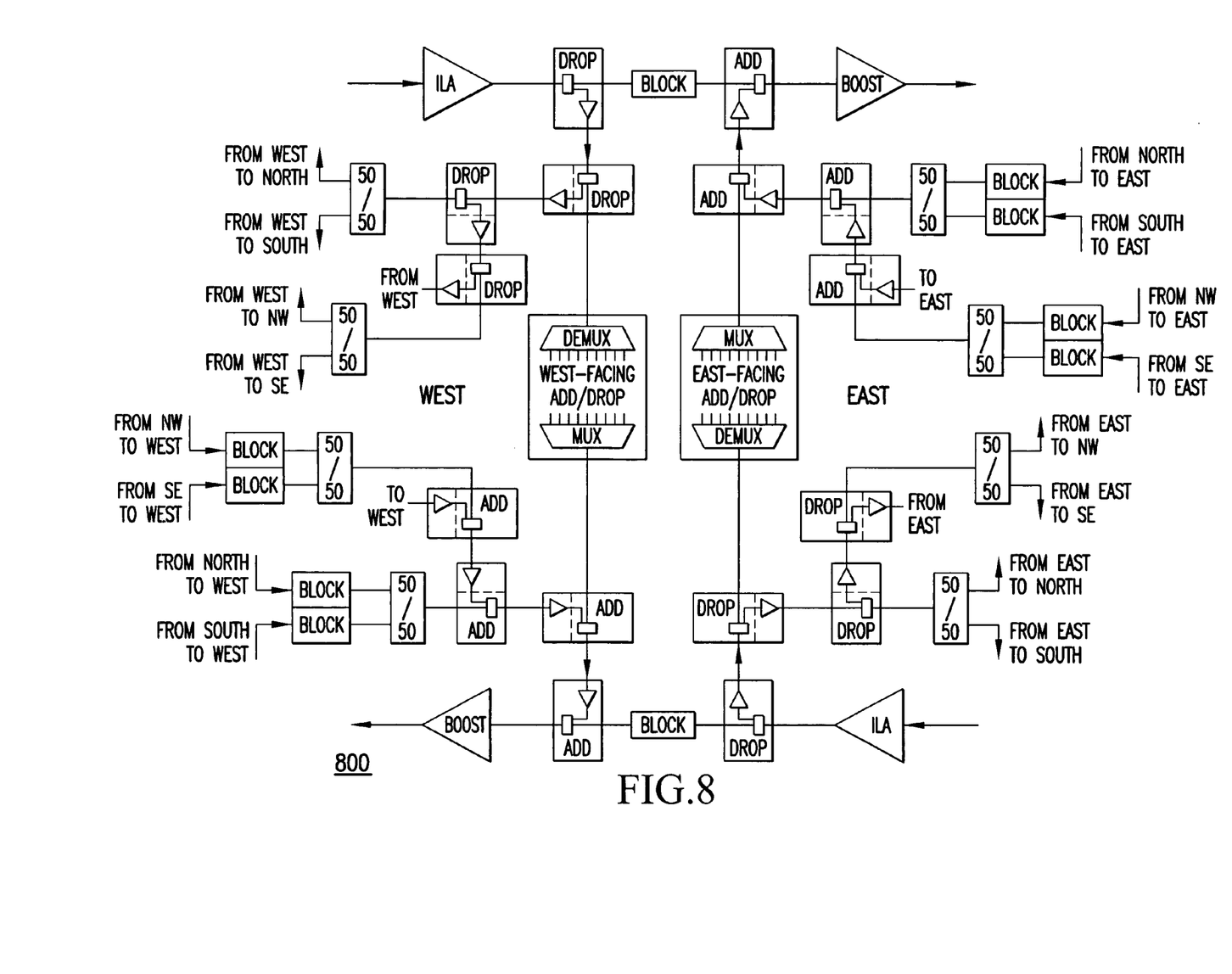
FIG. 8 illustrates an example of a further upgrade of a WSS/WSR according to an embodiment of the present invention.

FIG. 8 illustrates an example WSS/WSR 800 which has been upgraded from the WSS/WSR 700. Because the method used to upgrade from the WSS/WSR 700 to WSS/WSR 800 is similar to the method used to upgrade from OADM 300 to WSS/WSR 700, the detailed description is omitted.

While the invention has been described with reference to the exemplary embodiments thereof, it is to be understood that various modifications may be made to the described embodiments without departing from the spirit and scope of the invention thereof. The terms as descriptions used herein are set forth by way of illustration only and are not intended as limitations.

What is claimed is:

1. An optical apparatus with provisions for in-service upgrade to higher degree WSS/WSR, comprising:
   first and second input drop taps and first and second provisional drop taps, wherein each of the drop taps includes an input and first and second outputs and is configured to direct optical signals present at its input to both its first and second outputs;
   first and second output add taps and first and second provisional add taps, wherein each of the add taps includes first and second inputs and an output and is configured to direct optical signals present at both its inputs to its output;
   first and second blocking filters, wherein each of the blocking filters includes an input and an output and is configured to block a subset of optical channels of optical signals present at its input and allow the remainder of the optical channels to be passed to its output; and
   first and second wavelength demux/mux devices, wherein each of the wavelength demux/mux devices includes an input and an output and is configured to demultiplex optical signal present at its input to local destinations and multiplex the signals from local sources to its output,
   wherein the inputs of the first and second input drop taps optically communicate with first and second inputs of the apparatus, respectively,
   wherein the first outputs of the first and second input drop taps optically communicate with the inputs of the first and second blocking filters, respectively,
   wherein the second outputs of the first and second input drop taps optically communicate with the inputs of the first and second provisional drop taps, respectively,
   wherein the first outputs of the first and second provisional drop taps optically communicate with the inputs of the first and second wavelength demux/mux devices, respectively,
   wherein the outputs of the first and second wavelength demux/mux devices optically communicate with the first inputs of the second and first provisional add taps, respectively,
   wherein the outputs of the first and second provisional add taps optically communicate with the second inputs of the first and second output add taps, respectively,
   wherein the outputs of the first and second blocking filters optically communicate with the first inputs of the first and second output add taps, respectively,
   wherein the outputs of the first and second output drop taps optically communicate with first and second outputs of the apparatus, respectively,
   wherein the first and second provisional drop taps and first and second provisional add taps support a future in-service upgrade to a degree N WSS/WSR with the addition of an expansion drop tap and an expansion add tap, wherein N is an arbitrary integer greater than two,
   wherein the expansion drop tap including an input and first and second outputs, wherein the expansion drop tap is configured to direct optical signals present at its input to both its first and second outputs,
   wherein the expansion add tap including first and second inputs and an output, wherein the expansion add tap is configured to direct optical signals present at both its inputs to its output,
   wherein the second output of the first provisional drop tap optically communicates with the input of the expansion drop tap, and
   wherein the second input of the first provisional add tap optically communicates with the output of the expansion add tap.

2. The apparatus of claim 1, further comprising:
   an in-line amplifier,
   wherein the in-line amplifier includes an input and an output and is configured to amplify optical signals present at its input and direct the amplified optical signals to its output, and
   wherein
      the input of the in-line amplifier optically communicates with the first input of the apparatus and the output of the in-line amplifier optically communicates with the input of the first input drop tap, or
      the input of the in-line amplifier optically communicates with the second input of the apparatus and the output of the in-line amplifier optically communicates with the input of the second input drop tap.

3. The apparatus of claim 1, further comprising:
   a boost amplifier,
   wherein the boost amplifier includes an input and an output and is configured to amplify optical signals present at its input and direct the amplified optical signals to its output, and
   wherein
      the input of the boost amplifier optically communicates with the output of the first output add tap and the output of the boost amplifier optically communicates with the first output of the apparatus, or
      the input of the boost amplifier optically communicates with the output of the second output add tap and the output of the boost amplifier optically communicates with the second output of the apparatus.

4. The apparatus of claim 1, wherein at least one of the first and second input drop taps and the first and second provisional drop taps comprises:
   a splitter with an input and first and second outputs,
   wherein the splitter is configured to direct optical signals present at its input to its first and second outputs,
   wherein the input of the at least one of the first and second input drop taps and the first and second provisional drop taps optically communicates with the input of the splitter, and
   wherein the first and second outputs of the splitter optically communicates with the first and second outputs of the at least one of the first and second input drop taps and the first and second provisional drop taps, respectively.

5. The apparatus of claim 4, wherein the splitter of the at least one of the first and second input drop taps and the first and second provisional drop taps is configured to deliver a majority of output power to the first output of the splitter.

6. The apparatus of claim of claim 5, wherein the at least one of the first and second input drop taps and the first and second provisional drop taps further comprises:
   a line amplifier including an input and an output,
   wherein the line amplifier is configured to amplify optical signals present at its input and direct the amplified optical signals to its output, wherein the input of the line amplifier optically communicates with the second output of the splitter, and wherein the output of the line amplifier optically communicates with the second output of the at least one of the first and second input drop taps and the first and second provisional drop taps.

7. The apparatus of claim 4, wherein the splitter of the at least one of the first and second input drop taps and the first and second provisional drop taps is such that an amount of output power of the optical signals directed to each of the first and second outputs of the splitter is tunable.

8. The apparatus of claim 1, wherein at least one of the first and second output add taps and first and second provisional add taps comprises:

a combiner with first and second inputs and an output, wherein the combiner is configured to direct optical signals present at its first and second inputs to its output, and wherein the first and second inputs of the at least one of the first and second output add taps and first and second provisional add taps optically communicate with the first and second inputs of the combiner, respectively, and wherein the output of the combiner optically communicates with the output of the at least one of the first and second output add taps and first and second provisional add taps.

9. The apparatus of claim 8, wherein the at least one of the first and second output add taps and first and second provisional add taps comprises:

a line amplifier including an input and an output, wherein the line amplifier is configured to amplify optical signals present at its input and direct the amplified optical signals to its output, wherein the output of the line amplifier optically communicates with the second input of the combiner, and wherein the second input of the at least one of the first and second output add taps and first and second provisional add taps optically communicates with the input of the line amplifier.

10. The apparatus of claim 8, wherein the at least one of the first and second output add taps and first and second provisional add taps further comprises:

a line amplifier including an input and an output, wherein the line amplifier is configured to amplify optical signals present at its input and direct the amplified optical signals to its output, wherein the output of the combiner optically communicates with the input of the line amplifier, and wherein the output of the line amplifier optically communicates with the output of the at least one of the first and second output add taps and first and second provisional add taps.

11. The apparatus of claim 8, wherein the combiner of the at least one of the first and second output add taps and first and second provisional add taps is such that an amount of power of optical signals from each of the first and second inputs and directed to the output of the combiner is tunable.

12. The apparatus of claim 1, wherein at least one of the first and second blocking filters is a reconfigurable blocking filter and includes a control input, and wherein the reconfigurable blocking filter is configured to adjust a selection of the subset of the optical channels to be directed from its input to its output based on controls presented at its control input.

13. The apparatus of claim 1, further comprising:

an expansion splitter with an input and first and second outputs, wherein the expansion splitter is configured to direct optical signals present at its input to its first and second outputs, and wherein the first output of the expansion drop tap optically communicates with the input of the expansion splitter.

14. The apparatus of claim 13, wherein the expansion splitter is configured such that an amount of output power of the optical signals directed to each of the first and second outputs of the splitter is tunable.

15. The apparatus of claim 1, further comprising:

an expansion combiner with first and second inputs and an output, wherein the expansion combiner is configured to direct optical signals present at its first and second inputs to its output, and wherein the first input of the expansion add tap optically communicates with the output of the expansion combiner.

16. The apparatus of claim 15, wherein the expansion combiner is configured such that an amount of power of optical signals from each of the first and second inputs and directed to the output of the combiner is tunable.

17. The apparatus of claim 15, further comprising:

an expansion blocking filter, wherein the blocking filter includes an input and an output and is configured to block a subset of optical channels of optical signals present at its input and allow the remainder of the optical channels to be passed through its output, and wherein the output of the expansion blocking filter optically communicates with the first input of the expansion combiner or the output of the expansion blocking filter optically communicates with the second input of the expansion combiner.

18. The apparatus of claim 17, wherein the expansion blocking filter is a reconfigurable blocking filter and includes a control input, and wherein the reconfigurable blocking filter is configured to adjust a selection of the subset of the optical channels to be directed from its input to its output based on controls presented at its control input.

19. A method of converting an optical apparatus to enable in-service upgrades to higher degree wavelength selective switch/router (WSS/WSR), wherein the optical apparatus includes first and second inputs and first and second outputs, first and second input drop taps each configured to direct optical signals present at its input to both its first and second outputs, first and second output add taps each configured to direct optical signals present at its first and second inputs to its output, first and second blocking filters each configured to block a subset of optical channels of optical signals present at its input and allow the remainder of the optical channels to be passed through its output, and first and second wavelength demux/mux devices each configured to demultiplex optical signal present at its input to local destinations and multiplex the signals from local sources to its output, wherein the first outputs of the first and second input drop taps optically communicate with the inputs of the first and second blocking filters, the second outputs of the first and second input drop taps optically communicate with the inputs of the first and second wavelength demux/mux devices, wherein the outputs of the first and second wavelength demux/mux devices optically communicate with the second inputs of the second and first output add taps, and wherein the outputs of the first and second blocking filters optically communicate with the first inputs of the first and second output add taps, the method comprising:

inserting a provisional drop tap, which is configured to direct optical signals present at its input to its first and second outputs, wherein the input of the provisional drop tap optically communicates with the second output of the first input drop tap and the first output of the provisional drop tap optically communicates with the input of the first wavelength demux/mux device; and     inserting a provisional add tap, which is configured to direct optical signals present at its first and second inputs to its output, wherein the first input of the provisional add tap optically communicates with the output of the second wavelength demux/mux device and the output of the provisional add tap optically communicates with the second input of the first output add tap;

inserting an expansion drop tap, which is configured to direct optical signals present at its input to its first and second outputs, wherein the input of the expansion drop tap optically communicates with the second output of the provisional drop tap; and     inserting an expansion add tap, which is configured to direct optical signals present at its first and second inputs to its output, wherein output of the expansion add tap optically communicates with the second input of the provisional add tap;

wherein the first and second provisional drop taps, first and second provisional, expansion drop tap, and expansion add tap a future in-service upgrade to a degree N WSS/WSR, wherein N is an arbitrary integer greater than two.

20. The method of claim 19, further comprising:

inserting an expansion splitter configured to direct optical signals present at its input to its first and second outputs, wherein the first output of the expansion drop tap optically communicates with the input of the expansion splitter.

21. The method of claim 20, wherein the expansion splitter is configured such that an amount of output power of the optical signals directed to each of the first and second outputs is tunable, the method further comprising:

tuning the amount of output power directed to each of the first and second outputs.

22. The method of claim 19, further comprising: inserting an expansion combiner configured to direct optical signals present at its first and second inputs to its output, wherein the first input of the expansion add tap optically communicates with the output of the expansion combiner.

23. The method of claim 22, wherein the expansion combiner is configured such that an amount of power of optical signals from each of the first and second inputs and directed to the output is tunable, the method further comprising:

tuning the amount of power directed to the output from each of the first and second inputs.

24. The method of claim 22, further comprising: inserting an expansion blocking filter,     wherein the blocking filter is configured to block a subset of optical channels of optical signals present at its input and allow the remainder of the optical channels to be passed through its output, and     wherein the output of the expansion blocking filter optically communicates with the first input of the expansion combiner or the output of the expansion blocking filter optically communicates with the second input of the expansion combiner.

25. The method of claim 24, wherein the expansion blocking filter is a reconfigurable blocking filter and includes a control input, the method further comprising:

controlling a selection of the subset of the optical channels to be directed from the input to the output of the expansion blocking filter.

* * * * *